INVENTOR
ALBERT FRANCOIS LEBRE
BY
ATTORNEY

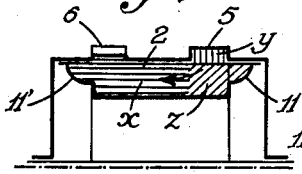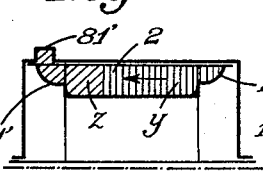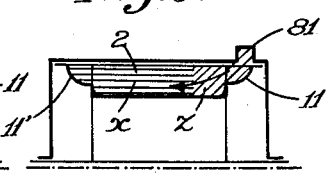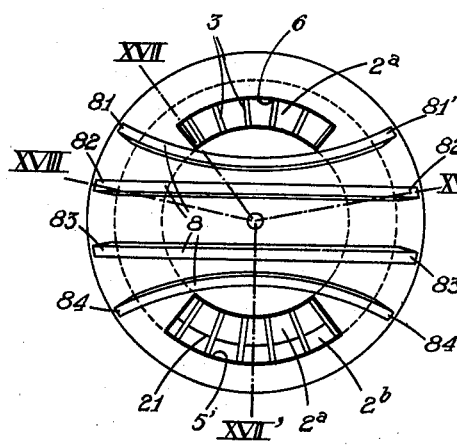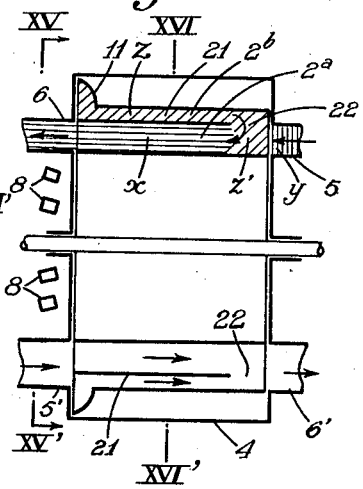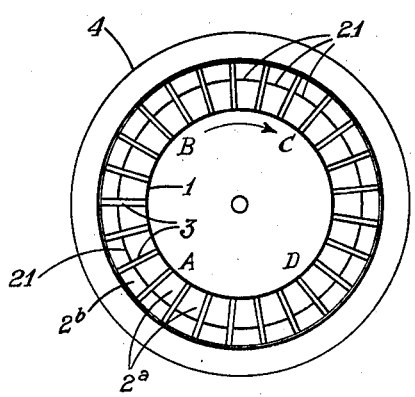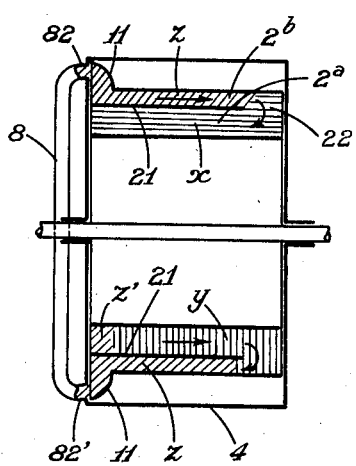

June 23, 1936.                A. F. LEBRE                2,045,152
PROCESS OF AND APPARATUS FOR PERFORMING CONVERSIONS
OF MECHANICAL AND THERMAL ENERGY
Filed March 16, 1934          3 Sheets-Sheet 3
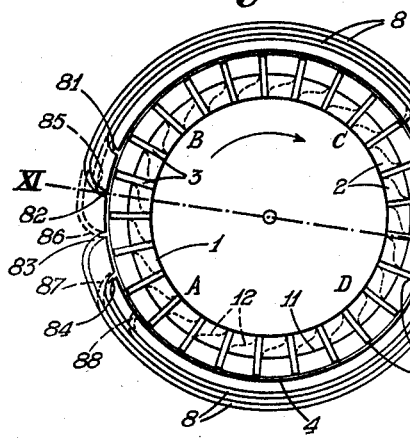
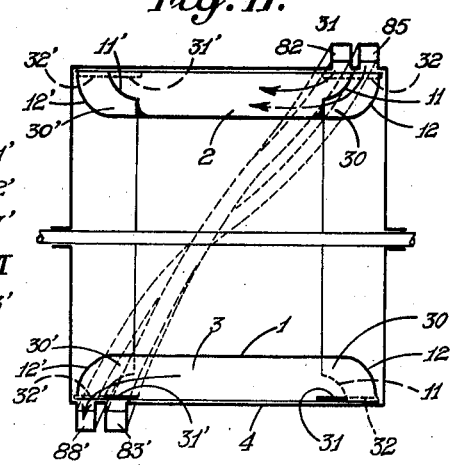
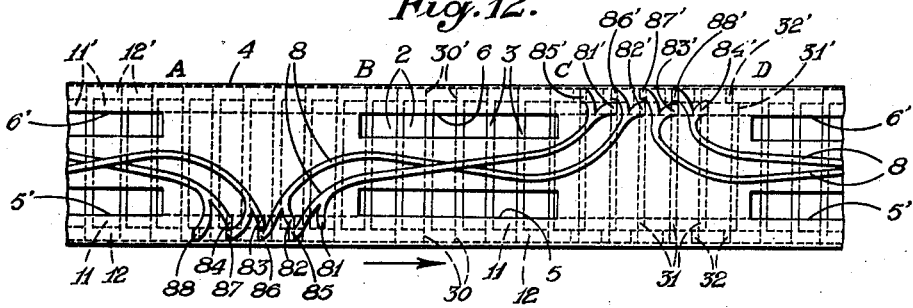
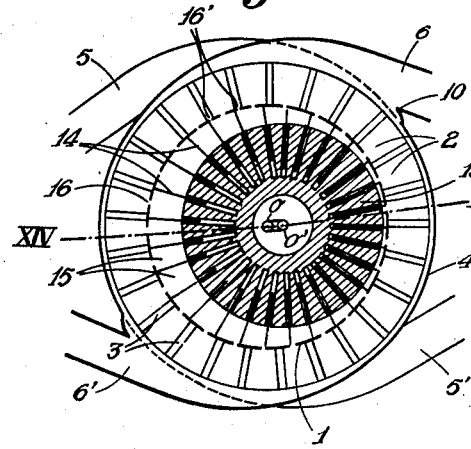
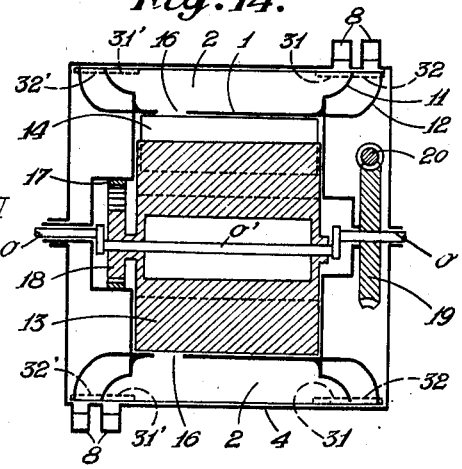
INVENTOR
ALBERT FRANCOIS LEBRE
BY
ATTORNEY Patented June 23, 1936

2,045,152

UNITED STATES PATENT OFFICE 2,045,152

PROCESS OF AND APPARATUS FOR PERFORMING CONVERSIONS OF MECHANICAL AND THERMAL ENERGY

Albert François Lebre, Paris, France

Application March 16, 1934, Serial No. 715,875
In France March 27, 1933

32 Claims. (Cl. 62—170)

The present invention relates to processes and apparatus wherein use is made of gases, in cycles comprising compression, heat exchange at a constant and relatively high pressure, expansion, and a heat exchange at a relatively low pressure, for the purpose of producing heat or cold, for example.

Since a gas absorbs energy when being compressed and releases energy when expanded, it is essential in thermodynamic cycles that the energy contained in the expanding gas be recovered as fully as possible, in order that it may be utilized again for assisting compression. The processes and apparatus proposed hitherto for this purpose have not given wholly satisfactory results, owing to important losses of energy arising during the stages of compression and expansion.

In one class of process, use was made of independent mechanical means, to produce compression and expansion separately. This class of process involved a complete separation of the currents of gases, respectively undergoing compression and expansion, by means of members such as pistons reciprocating in cylinders. The losses of energy entailed by such members, more particularly owing to friction, were too great owing to the additive effect thereof relatively to the total work of compression and expansion.

It is desirable to apply the action of the expanding gas upon the gas to be compressed whilst interposing therebetween the smallest possible number of moving parts. In this connection it has been proposed to omit all intervening moving parts, and to transmit pressure from the expanding gas directly to the gas to be compressed. Hence, in another class of process it was proposed to expand the gas by partial withdrawals therefrom, at decreasing pressures, whilst said gas was contained in a closed chamber and conversely to compress the gas contained in another closed chamber by successive additions of gas, at progressively increasing pressures which were always higher than those obtaining in the receiving chamber, this being effected by connecting through suitable ducts, chambers containing the gas to be expanded with chambers containing the gas to be compressed. These ducts, between which and the said chambers a relative motion was provided, acted as distributors progressively to lower the pressure of the gas to be expanded, said gas being contained in a series of chambers, and gradually to increase the pressure of the gas to be compressed in another series of chambers, thus ensuring a rational pressure exchange. The subsequent opening of the chambers into the high pressure zone allowed the compressed gas to issue from the chambers and to be displaced into a constant pressure heat exchanger. This displacement, brought about by the gas issuing from the heat exchanger, only called for an expenditure of energy equal to that due to the pressure losses in the circuit and could be produced by a fan.

It was thus sought to make use of the energy released by expansion to compress an equal volume of gas to a like pressure, in order to limit the mechanical energy used to that required to compensate variations in gas volume due to heat exchanges and losses due, more particularly, to leakages.

If, in this latter class of process, losses by friction due to moving partitions were eliminated, on the other hand, other losses were created which involved practical failure due to the intermingling of gases to be compressed and gases to be expanded, and to unavoidable leakages more particularly such as arose, from the partitioning of the gas currents in the chambers, along the whole of the surfaces separating the chambers from one another.

The object of the process according to my invention is to overcome the disadvantages innate in these two classes of processes, and to combine the advantages derived from partitioning with those resulting from the direct action of the gas currents upon each other.

The invention is based upon observation of the fact, that an ideal means of separating the principal gas currents (i. e. the currents of gas undergoing compression and of gas undergoing expansion) is provided by the gas current, resulting from pressure exchange between the expanding gas and the gas to be compressed, provided it be found possible to prevent said gas current from mixing and intermingling with the principal currents, during its passage outside the connecting ducts.

To this end the process according to my invention consists in so maintaining and guiding the pressure exchange current, that it flows in the same direction as the two principal currents and that, while remaining distinct therefrom, it is interposed in the fashion of a gaseous partition, between said two currents which are at different temperatures and flow respectively towards and away from the heat exchanger. When the process is performed in a rotary apparatus comprising a ring-shaped series of chambers moving relatively to a fixed distributor or a stationary series of chambers with a moving distributor, I am able so to regulate the speed, the orientation and the position of the pressure exchange current that said current flows through the rotary apparatus, between the stages of compression and expansion, without leaving said apparatus and hence without participating in the heat exchange.

In order that the pressure-exchange current may act after the fashion of a gaseous partition it is necessary that, in contrast to previous practice with processes of the second class aforesaid, the current of gas from the expansion phase to the compression phase be kept as continuous as possible, in regard to speed, orientation and position. More particularly the connecting ducts must at all times communicate with one at least of the two phases and their orifices must be so arranged, relatively to the chambers, as to obviate any short-circuit, or leakage, between two neighbouring chambers, during the phases of expansion or of compression.

To this end the orifices of the connecting ducts are given a width equal to that of the partitions separating the inlet ports of the chambers so as to allow of said orifices being closed, during their passage from one chamber to the next, thus averting a short-circuit. Furthermore the arrangement is such that when one end of a duct is closed by a partition, the opposite end of said duct is situated centrally of a chamber. Stoppages and jars liable to promote the mixing or mingling of the fluids are thus avoided, and the continuity of the variations of pressure is enhanced.

The pressure-exchange current thus delivered in a practically constant manner, through the connecting ducts, is given a substantially constant direction, relatively to the currents in the expansion and compression phases, owing to suitable orientation of the orifices of the ducts which communicate with the chambers containing the main currents. Said orifices are distributed exclusively over that portion of the casing, which closely surrounds the chambers, in order to avoid that the ducts should communicate periodically with the admission and exhaust pipes.

Since the circuit of the pressure-exchange current is completed through the chambers into which the compressed and heated gas is displaced by the cooled compressed gas to be expanded, before said compressed and heated gas escapes into the heat exchanger, the openings of the admission and exhaust pipes are shaped and arranged to ensure the continuity of the pressure-exchange current during this phase, and to reduce the speed at which the principal currents are admitted and exhausted, in order to avert too abrupt a passage from one phase to the next succeeding one.

The gaseous current formed between the expanding gas and the compressed gas by said pressure-exchange current may be so extended as to complement the material partition separating adjacent chambers and to prevent leakage between them along the periphery of the casing. To this end, the vanes or partitions of the rotor separating the successive chambers are made hollow, and the spaces thus formed within these vanes or partitions are caused to communicate with connecting ducts, wherein a pressure obtains, which differs slightly from the pressures within the chambers to be separated. On the expansion side this pressure will be slightly lower than those obtaining on either side of the partition under consideration, and on the compression side it will be slightly higher, in order to by-pass a portion of the pressure-exchange current through the partitions and connecting ducts, without impairing the continunity of said current, and thus to complement the material partitions afforded by the partitions or vanes, by means of gaseous currents located along the edges of said vanes. To the gas currents at different temperatures which are to be separated, and to the pressure-exchange current which is to ensure their separation, must be added, within the apparatus, a current required to compensate the variations of volume, due to changes of temperature, undergone in the heat exchangers situated outside the apparatus; i. e. between the moment when a gas current issues from the apparatus, and the moment it re-enters said apparatus after having participated in a heat exchange. According to the invention, use is made of such compensating current, to enhance the continuity of the pressure-exchange current. As is the case with the latter, said compensating current flows parallel to the principal current, a result advantageously obtained by associating with the chambers of constant volume chambers of varying volume adapted to be added thereto or substracted therefrom, as need may arise.

According to one practical and simple embodiment of the invention the chambers arranged in ring formation and mounted for rotation around the axis of the ring, are closed by a casing during the stages of compression and expansion, said casing merging into volutes in two diametrically opposed zones to guide the principal currents out of the apparatus during the stages of displacement at constant pressure. The zones of compression on one hand, and of expansion on the other hand, communicate with each other through connecting ducts secured to the casing. The vanes or partitions separating the chambers are hollow and the pressure exchange current is by-passed through them whilst they traverse the zones aforesaid.

A compressor rotor having blades thereon is mounted eccentrically within the ring, the variable capacity required to create the compensating current flowing parallel to the gas current undergoing compression, being constituted by the space comprised between successive blades.

My invention will now be described in greater detail with reference to the accompanying drawings, which illustrate diagrammatically and by way of example the principle of the invention, some preferred embodiments thereof and explanatory diagrams.

Figs. 7, 8 and 9 are explanatory sectional views similar to Fig. 6.

Fig. 10 is a sectional view at right angles to the axis of rotation of an apparatus provided with means for by-passing a portion of the pressure-exchange current through hollow partitions or vanes.

Fig. 11 is a section on line XI—XI of Fig. 10.

Fig. 12 is a development of the periphery of the casing and of the connecting ducts of said apparatus according to Figure 10.

Fig. 13 is a section similar to Fig. 4, illustrating the arrangement of a compressor designed to provide a compensating current adapted to cooperate with the pressure-exchange current.

Fig. 14 is a section on line XIV—XIV of Fig. 13.

Fig. 15 is a sectional elevation on line XV—XV' of Fig. 17, illustrating another form of apparatus.

Fig. 16 is a section on line XVI—XVI' of Fig. 17.

Fig. 17 is a radial cross-section on line XVII—XVII' of Fig. 15 and

Fig. 18 is a radial cross-section on line XVIII—XVIII' of Fig. 15.

Figure 1:
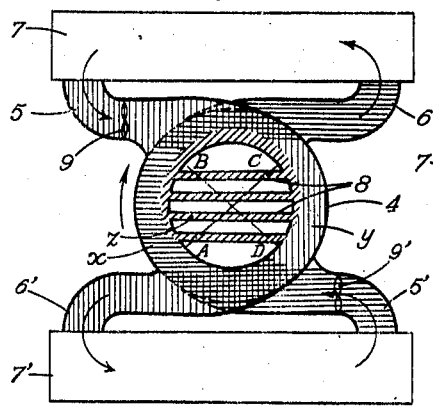
Fig. 1 is a diagrammatic view of the apparatus as a whole.

In the drawings 1 indicates the rotor comprising a ring of chambers 2 separated from each other by partitions or vanes 3, said rotor revolving in a casing 4 provided with inlet pipes 5, 5' and outlet pipes 6, 6' connected with a high pressure heat exchanger 7 and a low pressure heat exchanger 7' respectively.

The rotor revolving as indicated by the arrow (Fig. 1), it is assumed that compression takes place from A to B, and displacement under high pressure from B to C, the compressed and heated gas being cooled under constant pressure in the heat exchanger 7, and led back to the rotor between B and C, wherein it expands from C to D. Upon having resumed its original pressure the cooled gas is delivered between D and A, into the exchanger 7' wherein it becomes heated under constant pressure; thence it is returned to the rotor, recompressed from A to B and started upon a fresh cycle. In the case of a chamber performing a complete revolution the successive stages or phases are therefore: compression (A—B), displacement (B—C), expansion (C—D) and displacement (D—A).

The ducts interconnecting the phases of expansion C—D and of compression A—B are shown at 8. Each of them is so arranged as temporarily to connect a chamber under expansion with a chamber under compression at a lower pressure. A transfer of fluid therefore takes place through said connecting ducts, from the chambers under expansion to the chambers under compression with which they are connected in succession. Whilst following the arc A—B, a chamber containing the fluid to be compressed will therefore receive a slight addition of fluid from each connecting duct, and will undergo a series of partial compressions adapted to raise the pressure of the fluid contained therein to the final pressure required. Likewise, whilst travelling along the arc C—D, some of the fluid to be expanded will issue into each duct 8, until such fluid has resumed its initial pressure.

Since the fluids in A—B and C—D are at different temperatures, it is essential that they do not mix, either in the chambers 2 or in the displacement zone B—C where admission and exhaust take place simultaneously under constant pressure. According to my invention, I attain this result by maintaining in the ducts 8 and in the chambers 2 a continuous current adapted to separate the two main currents, to accompany them through phases A—B, B—C and C—D and to act somewhat like a gaseous screen or partition between them, without however entering the heat exchanger 7.

Figure 2:
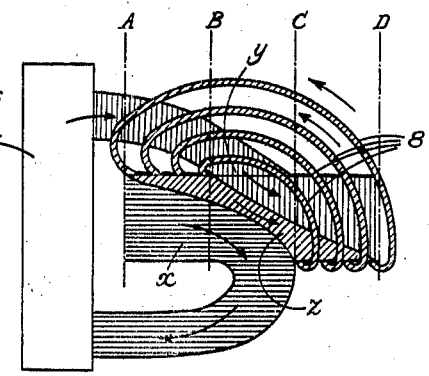
Fig. 2 is a diagram illustrating the functions of the pressure-exchange current.

The part played by such a gaseous partition will become apparent from a consideration of Figs. 1 and 2 wherein the horizontal shading lines indicate the course followed by the fluid $x$ to be compressed, and the vertical lines the course of the fluid $y$ to be expanded, the oblique lines indicating the pressure-exchange current $z$. As is illustrated most clearly in the diagram of Fig. 2, wherein the development of arcs A—B, B—C, C—D is shown as abscissae, and the width of the ring of chambers as ordinates, the arrangement is such that current $z$ shall flow in the ducts 8,—urge the fluid to be compressed into the chambers comprised in the zone A—B,—separate in zone B—C the outgoing, compressed and hot fluid from the incoming fluid, similarly compressed but cooled,—and flow back thereafter into the ducts 8 under a pressure equal to that of the gas to be expanded in the zone C—D.

The gaseous current may flow through the ring of chambers, from the centre towards the periphery thereof or, inversely, from the periphery towards the centre, or again in a direction parallel to the axis of rotation. This latter arrangement, whereof two alternative constructional embodiments are shown in Figs. 5 and 6 affords certain advantages as regards simplicity of construction, but it is to be understood that use of the present invention is by no means limited thereto.

Figure 5:
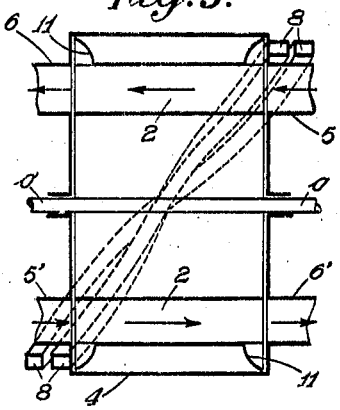
Fig. 5 is a diametrical section showing a modification.
Figure 4:
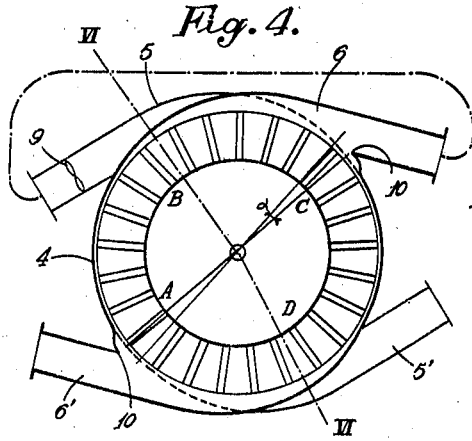
Figure 6:
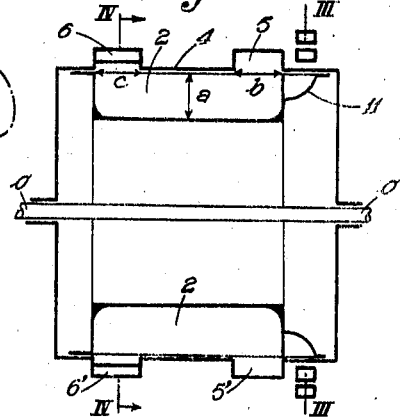
Fig. 6 is a diagrammatic section on line VI—VI of Fig. 4.

In the case of Figs. 5 and 6 the circulation of the gaseous streams through the heat exchangers, the inlet and outlet pipes and the rotary apparatus, is ensured by suitably located fans 9, 9' (Fig. 1). The openings of the inlet and outlet pipes 5, 5' and 6, 6' extend throughout the length of arcs B—C and D—A. In Fig. 5 said pipes are arranged to extend over the parts B—C, D—A of the ring of chambers in a direction parallel to the axis of rotation, whilst in Fig. 6 they enclose the peripheral edges of said parts, and are voluted as shown in Fig. 4.

The connecting ducts 8 are external to the rotor. They likewise open into the casing 4 and are arranged on one side or on both sides of the same.

Figure 3:
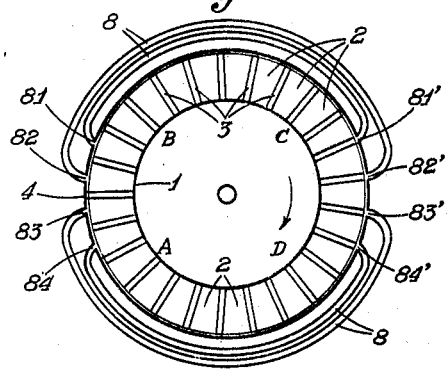
Figs. 3 and 4 are diagrammatic sections taken through planes at right angles to the axis of revolution of a rotary apparatus, said sections being taken respectively on lines III—III and IV—IV of Fig. 6.

The ends of the chambers 2 are provided with distributing ports 11, 11', in the shape of spoons for example, which on passing before the orifices of the ducts 8, connect the orifices 81, 82, 83, 84 (Fig. 3) at one end thereof with the chambers comprised in zone A—B, and orifices 81', 82', 83', 84' at the opposite end of said ducts with the chambers comprised in zone C—D.

In order that the flow of the gas currents shall be more uniform the orifices 81—84, 81'—84' of ducts 8 are given the same width as the vanes or partitions 3 (Fig. 3), thus averting the short-circuits which would necessarily arise if the ducts were of greater cross-section. The occlusion caused by the passage of the vanes over the orifices of the ducts 8 only lasts a fraction of a second and the effect thereof may be lessened if care is taken that the moment one end of a duct 8 is closed by a vane 3, the opposite end is at the center of a chamber. In this way both ends of the ducts can never be closed simultaneously, whereby the continuity of operation is maintained and the progressiveness thereof is doubled. Indeed, whilst a chamber under expansion (arc C—D) communicates with one particular duct, the other end of said duct discharges successively into two consecutive chambers comprised in A—B, whereby two partial compressions are obtained during the pressure drop occurring in the corresponding arc. With this arrangement likewise two chambers under expansion will deliver successively into one same duct, whilst it is connected with one chamber under compression. As a result, the number of partial expansions and of partial compressions is twice that of the number of ducts in use, i. e. eight in the case of the example shown in the drawings, losses of energy and speed of circulation thus being reduced.

As is shown in the drawings, the orifices of the ducts 8 only extend over the parts of arcs A—B and C—D which are closely surrounded by the casing 4, thus preventing said ducts from communicating with chambers not yet closed by the casing, and making it possible moreover, to provide delayed admission and exhaust.

To secure the progressive flow of fluids from one stage to the next one without any jar, means are provided to ensure that, over the whole length of arcs B—C and D—A, the velocity of the gas entering the chambers 2 on one hand, and its outgoing velocity from said chambers on the other hand, shall be equal in magnitude and orientation to the speed assumed by the gas within the chambers under the combined influence of the movement of said gas in said chambers and of the latter's rotation. To ensure this result the inlet pipes 5, 5' and the outlet pipes 6, 6' are arranged in tangential relationship to the ring, and their cross-section is varied in accordance with a parabolic function.

The gas admitted into a chamber at the end of a phase of displacement B—C or D—A is endowed with a certain velocity. The casing must however close this chamber in order to initiate the next phase (expansion or compression). In order to avert jars, the internal edge of the exhaust pipe has been given the form of a nose 10 (Fig. 4), whose point is slightly spaced from the ring of chambers and is directed as the component of the velocities of the escaping current, the internal face of said nose gradually merging into a tangent to the ring of chambers.

Instead of using a nose such as 10, I may also retard the velocity of the gas before closure, by effecting such closure by means of a member comprising parallel blades adapted to cause a pressure drop.

Likewise, in order to retard the velocity at the end of the phase of displacement it is desirable that inlet pipe 5 should close before exhaust pipe 6. This off-setting, indicated by angle α on Fig. 4, is usually of a value approximating to that of the angle covered by the nose 10.

The chambers themselves are shaped so that their cross section $a$, taken at right angles to the direction of gas flow, is approximately equal to their admission area $b$ and to their exhaust area $c$ (Fig. 6). In this figure, admission and exhaust take place across the periphery of the ring of chambers. Alternatively they may of course be effected through the sides or through the interior of the ring.

In operation the current hereinbefore called the pressure exchange current will be set up alongside of and parallel to the principal currents for a great part of their course, owing to the continuity of circulation of the gas currents and to the means provided for guiding the same. If a chamber 2 (Fig. 7) be considered at the moment when the compression phase has just ended, the horizontally shaded zone indicates hot compressed gas as it begins to escape through 6, the vertically shaded zone denotes the compressed but cooled gas admitted through 5, and the oblique shading lines indicate the pressure-exchange current $z$, which has been admitted into the chamber by the ducts 8 during the compression phase A—B, and has compressed the gas contained therein. During the displacement phase B—C, the current $z$ travels from one end of the chamber to the other whilst remaining interposed between the warm, outgoing current and the cold, incoming current. Velocity is so regulated, that pipe 6 is closed when current $z$, reaches the opposite end of the chamber (Fig. 8), whereupon orifices 81', 82', 83', 84' of ducts 8 are brought in succession opposite the port 11', and each of them allows a portion of the current $z$ to pass therethrough. Since the opposite ends of ducts 8 open into chambers under lower pressures, the expansion of the fluid from C to D drives the current $z$ through the connecting ducts 8 and into the chambers comprised within the zone A—B. Fig. 9 shows a chamber of zone A—B whereinto the ports 11 deliver current $z$, said current gradually compressing the gas until it escapes (Fig. 7) and the displacement phase starts afresh.

In Figs. 7 to 9 the two ends of ducts 8 are arranged, at opposite sides of the rotor, so as to restore the pressure-exchange current to its initial position. In practice it is possible to arrange the ducts at one side of the rotor by using one set of ports 11 (Fig. 6) only, the stream $z$ then flowing in the chamber first in one, and then in the reverse direction.

In some cases I may advantageously determine the location of the pressure-exchange current and guide positively such current within the chambers 2 by means of partitions extending into said chambers in order more effectively to prevent intermixing of the gas currents at different temperatures, such partitions bounding in each chamber a zone more particularly adapted to receive and localize the pressure-exchange current. In a convenient embodiment of my invention, illustrated in Figs. 15 to 18 of the accompanying drawings, the said partitions, shown at 21, extend co-axially to the rotor 1, in a direction parallel to the flow of gases during the phase of displacement or scavenging.

In this form of apparatus, the general arrangement of the inlet and outlet pipes 5, 6 and 5', 6' is similar to that shown in Fig. 5. In each chamber is a partition 21 which divides it into a main chamber 2a adapted to be periodically connected with the inlet and outlet pipes 5, 6 and 5', 6', and an antechamber 2b more particularly intended for accommodating the pressure-exchange current. To this end each antechamber 2b is provided at one end with a port 11 for letting in or out the pressure-exchange current and at the other end with an opening 22 communicating with the adjacent chamber 2a.

It is desirable that during the phase B—C of scavenging under high pressure the portion of the pressure-exchange current $z$ located in said antechamber be excluded from the scavenging in order that only the warm compressed gas $x$ be admitted to the heat-exchanger 7. For this purpose the inlet pipe 5 and outlet pipe 6 which are connected with the high-pressure heat exchanger 7 in the manner shown in Fig. 1, have a reduced height corresponding to that of the chamber 2a (Figs. 15 and 17), so that only the chambers 2a are swept by the gases during the phase B—C of displacement or scavenging under high pressure.

The low-pressure pipes 5' and 6', on the contrary, may extend over the entire height of both chambers 2a and 2b, as it is of advantage that, during the phase D—A of scavenging under low-pressure, the pressure-exchange gas shall be evacuated and caused to give off outside the apparatus the cold generated by its expansion.

It will be observed that it is advisable that the direction of flow of the gases in the pipes 5', 6' be reversed with respect to the direction of flow in the pipes 5, 6, in order that only the gas z' which has been driven out of the antechamber 2b shall always form, during the scavenging, a cushion between the warm gas x and the cold gas y, the scavenging under high pressure being so regulated as to avoid as much as possible, or desirable, the escape of this cushion from the rotor.

It will be understood, with reference to Figs. 17 and 18, that the function of the pressure-exchange current remains the same as described above. During the compression phase A—B, the pressure-exchange current z delivered into an antechamber 2b through the successive orifices 81, 82, 83, 84 of the ducts 8, gradually compresses the gas in the adjacent chamber 2a (Fig. 18, top). The relative dimensions of the chambers 2a, 2b are such that at the beginning of the scavenging phase B—C, a part Z' of the gas z has reached a position opposite the inlet 5 and separates the outflowing warm gas x from the incoming cold gas y (Fig. 17, top). During the expansion (C—D) the gas z is driven back through the openings 81', 82', 83', 84' of the ducts 8 (Fig. 18, bottom) towards the chambers in the phase of compression. Then the low-pressure scavenging (phase D—A, Fig. 17, bottom) carries away the cold gas which filled the chambers 2a and 2b and replaces them by warmer gas to be compressed.

According to a further feature of my invention, the gaseous partition constituted by the pressure-exchange current interposed between the expanding gas and the gas undergoing compression, is so extended as to complete the separation between adjacent chambers, and to avert leakages from one chamber to another along the internal periphery of the casing. I obtain this by by-passing a portion of the pressure-exchange current from the ducts 8 through the vanes or partitions 3 which are then made hollow. To this end, as illustrated by way of example in Figs. 10 to 12, the hollow partitions 3 are extended outwardly at 30, 30' respectively, between the ports 11 on one hand, and 11' on the other hand, and they are connected to forwardly offset distributing members or ports 12, 12', while the ducts 8 are provided with branches whose orifices 85, 86, 87, 88 and 85', 86', 87', 88' are offset rearwardly with respect to the normal orifices 81, 82, 83, 84 and 81', 82', 83', 84' by an angle corresponding to one chamber.

In this manner, since the ports 12' are placed into communication with the successive branches 85', 86', 87', 88' during the expansion phase, the pressure inside a vane 3 between C and D will be slightly lower than that simultaneously obtaining in the two chambers separated by said vane. A portion of the current z therefore will be by-passed, from each chamber under expansion, towards and through the vane and into the duct 8 in front of which said vane passes, said portion then joining the main body of current z in said duct.

During the compression phase, the ports 12 are connected in a like manner with the branches 85, 86, 87, 88 of ducts 8, situated rearwardly of the respective orifices 81, 82, 83, 84 of said ducts by an angle corresponding to one chamber, so that the pressure inside a vane is slightly higher than that obtaining in the two chambers adjacent the same. A portion of the current z will therefore be by-passed from each duct 8, be collected by the ports 12 of successive vanes, and flow through the latter and follow the internal periphery of the casing to reach the chambers in the compression stage.

The quantities of fluid thus by-passed and delivered from the expansion phase on one hand, and into the compression phase on the other hand, may be variable but they must be sufficient to prevent leakages between adjacent chambers.

It will be seen that in the position of the rotor illustrated in Figs. 10, 11, 12, the orifices of ducts 8 on the "compression" side are in the radial axes of the chambers fed by said ducts, whereas on the "expansion" side the orifices face partitions 3, according to a characteristic hereinbefore set forth. In meeting this requirement it is important that, at the moment under consideration, the orifices facing the partitions will be closed thereby. To this end, over a portion corresponding to the width of the ports 11 and 11' each hollow partition or vane 3 is closed outwardly by peripheral walls 31, 31' which separate successive ports and thus prevent direct communication between the orifices 81—84, 81'—84', and the interior of partitions 3. The successive ports 12, 12' are likewise separated from each other by walls 32, 32'. For the sake of clearness, the walls 31, 31', 32, 32' in Fig. 12 have only been shown in the expansion zone C—D.

In the apparatus described so far the chambers 2 have a constant volume. However during its passage into the heat exchanger 7 or 7' the gas undergoes a change of volume due to variation of temperature, and this change of volume must be compensated by an equivalent addition or withdrawal of gas. Possible leakage losses must likewise be compensated. This work of compensation involves the most important expenditure of energy in the cycle and it is effected in the case of the example under consideration, by combining a compressor rotor with the ring of constant capacity chambers under such conditions that the continuity of the pressure-exchange current is not affected.

As is shown in Fig. 13, the rotor 13 of this compressor is mounted eccentrically within the rotor 1 and comprises a plurality of radially sliding blades 14, the number of which is slightly larger than that of the vanes 3 of the rotor 1. These blades confine variable capacity chambers 15, each connected with a chamber 2 by an opening 16.

The relative displacement of blades 14 along the inner wall of rotor 1 is limited to a small alternating motion if rotors 1 and 13 rotate at the same speed. Since each chamber 2 is in constant communication with a chamber 15 it constitutes, with the latter, a chamber whereof the capacity varies during the course of a revolution between a maximum volume corresponding to that occupied by the gas at its temperature before admission into exchanger 7 and its minimum volume corresponding to that of said gas after passing through the exchanger.

In practice however, such an arrangement would suffer from the disadvantage of periodically reversing the direction of motion of each blade along the wall 1. This disadvantage may be overcome by causing the rotor 13 to revolve slightly faster than rotor 1, so that the relative velocity of the blades along wall 1, which is a sinoidal function, shall always be positive. As is shown in Fig. 14, the openings 16 formed in the inner wall of the rotor 1 are so arranged that the compensating air current is sent into that portion of each capacity which contains gas at a like temperature. In the case of Fig. 14, the opening 16 faces the end of the capacity 2 which is opposite port 11 so that the gas entering by said opening is in contact with the compressed and heated gas, and not with the gas issuing from the connecting ducts. Thus, the opening also faces the outlet pipe 6 and the gas flowing through said opening is enabled to escape without impeding the main currents in the zone B—C.

The result of this arrangement is that the current generated by the bladed rotor is added to or subtracted from the current of air displaced at constant pressure. In point of fact, it is during the stages B—C and D—A of displacement or scavenging at constant pressure, that the bladed compressor must cause the variations of volume, and the angle of advance of said compressor must be selected with that end in view. During the stages of expansion and compression, the variation in volume is caused by the connecting ducts 8.

If desired the arrangement shown likewise allows use to be made of the compensating current, to assist the pressure-exchange current in preventing the occurrence of leakages along the lines of contact of surfaces moving relatively to each other, to this end it is only necessary to provide additional openings at points 16' so situated in the internal wall of rotor 1 as to cause a portion of the compensating current to be by-passed through the hollow vanes or partitions 3.

Since the variation of volume produced by the compensator is practically restricted to two diametrically opposed arcs, it will be readily understood that if the angular position of said arcs be modified relatively to the arcs B—C and C—D, the variation of volume obtained during the constant pressure displacement will likewise be varied. The delivery of the compensator may be modified as desired by regulating the lead of the compressor, i. e. by turning the centre O' of the rotor 13 through a given angle around the centre O of rotor 1. Means thus are available to act upon the compensating current and, through the same, upon the other gas currents, irrespective of the manner in which the speed of rotation of the apparatus may be adjusted.

Fig. 14 shows an arrangement whereby this result may be attained in a simple and convenient manner. To the rotor 1 revolving on a stationary shaft O is rigidly secured an internally toothed ring 17. On shaft O is a crank O', upon which rotates the rotor 13, rigidly connected to a spur wheel 18 meshing with ring 17. Rotor 1 is driven by an appropriate motor and actuates rotor 13 at a speed determined by the ratio of the gears 17 and 18. A worm wheel 19 secured to shaft O meshes with a worm 20. The angular position of crank O', i. e. the compressor lead may thus be adjusted as desired by rotating said worm. This adjustment may be effected during operation of the apparatus, as gears 17 and 18 always remain in mesh.

The constructional embodiments above set forth may of course be varied without departure from the scope of the present invention. For example circulation of the gas currents through the chambers may be directed, as aforesaid, from the centre of the rotor towards its periphery or vice versa. In either case the circulation of the currents may be maintained by the apparatus itself, acting as a fan, the use of separate fans then being superfluous. The partitions between chambers then would be defined more exactly by the term "vane" which has been used hereabove by extension, to distinguish said partitions from the other walls. On the other hand the ring of chambers, the connecting ducts and other distributing members as well as the compensator may be shaped or arranged in any suitable manner. The term "rotary apparatus" herein is intended to include any apparatus whereof one part, whether the series of chambers or the distributor, is movable relatively to the other part, whatever may be the form or the arrangement of said parts.

I claim:

1. In a process of performing conversions of thermal and mechanical energy, in which a gas is successively subjected to a variation in pressure, a heat-exchange under constant pressure, and a reverse variation in pressure, the steps of directly transmitting pressure from the gas in one stage of pressure variation to the gas in another stage of pressure variation thus creating a pressure-exchange current, maintaining and guiding said current to cause same to form a gaseous partition between the gas in said first stage of pressure variation and the gas in said second stage of pressure variation.

2. In a process of performing conversions of thermal and mechanical energy, in which a gas is successively subjected to a compression stage, a heat-exchange under constant pressure, and an expansion stage, the steps of circulating the gas in the expansion stage and the gas in the compression stage at a certain speed and in a certain direction, directly transmitting pressure from the gas in the expansion stage to the gas in the compression stage thus creating a pressure-exchange current, causing said pressure-exchange current to circulate at the same speed and in the same direction as the gas in the expansion stage and the gas in the compression stage, and causing said pressure-exchange current to form a gaseous partition between the gas in the expansion stage and the gas in the compression stage.

3. In a process as claimed in claim 2, circulating the pressure-exchange current in a closed circuit and causing it to accompany successively the gas in the compression stage and the gas in the expansion stage without partaking in the heat-exchange.

4. In a process as claimed in claim 2, by-passing a portion of the pressure-exchange current to prevent leakage due to differences in pressure at different points of the circuit.

5. In a process as claimed in claim 2, compensating the variation in gas volume due to the heat exchange by means of a current guided in the same direction and at the same velocity as the pressure-exchange current.

6. In a process as claimed in claim 2, by-passing a portion of the pressure-exchange current to prevent leakages due to differences in pressure at different points of the circuit, compensating the variation in gas volume due to the heat exchange by means of a current guided in the same direction and at the same velocity as the pressure-exchange current, and causing a portion of the compensating current to unite and cooperate with that portion of the pressure-exchange current utilized to impede leakage.

7. In an apparatus for performing conversions of thermal and mechanical energy, the combination of a stationary part and a movable part, one of said parts comprising a plurality of chambers, the other of said parts comprising a distributor, said distributor comprising a casing surrounding said chambers, inlet and outlet pipes for said chambers and ducts for periodically connecting said chambers with each other, a heat-exchanger connected to said inlet and outlet pipes, and means for setting up and maintaining a current of gas within said chambers and through said ducts.

8. In an apparatus for performing conversions of thermal and mechanical energy, the combination of a stationary part and a rotary part, a heat-exchanger, one of said parts comprising a ring of chambers and radial partitions between said chambers, the other of said parts comprising a casing surrounding said chambers, inlet and outlet pipes adapted periodically to connect said chambers with said heat exchanger, and ducts adapted to connect chambers of a region beyond said pipes with chambers of a region in front of said pipes, the chambers in one of said regions being adapted to contain gas in the course of expansion and the chambers in the other of said regions being adapted to contain gas in the course of compression, and means for setting up and maintaining a so called "pressure-exchange" current of gas within said chambers and through said ducts from the chambers in the region corresponding to expansion to the chambers in the region corresponding to compression.

9. In an apparatus as claimed in claim 8, said ducts having end orifices of a width equal to that of the said radial partitions.

10. In an apparatus as claimed in claim 8, said ducts having end orifices so arranged and so proportioned that one extremity of a duct is occluded by one of said partitions while the opposite end of said duct is in the radial axis of one of said chambers.

11. In an apparatus as claimed in claim 8, ports for each of said chambers, said ports being adapted to cooperate with the end orifices of said ducts.

12. In an apparatus as claimed in claim 8, said inlet and outlet pipes having orifices equal to the cross-section of the chambers at right angles to the direction of the gas currents, an orientation which is tangential to the flow of the currents at the outset of admission and the end of exhaust and a cross sectional area varying according to the generally parabolic law governing delivery during the displacement stages.

13. In an apparatus according to claim 8, said inlet and outlet pipes having closure edges so shaped and so placed relativey to each other as to influence the velocity of the gas current so as to cause same to become tangential to the ring of chambers.

14. In an apparatus according to claim 8, said outlet pipes having a closure edge shaped as a nose having its point slightly spaced away from the ring of chambers and connected by a curve with a tangent to said ring.

15. In an apparatus according to claim 8, means for guiding the pressure-exchange current in said chambers in a direction parallel to the axis of said rotary part.

16. In an apparatus according to claim 8, partitions dividing each chamber of the row of chambers into a main chamber and an antechamber, each said antechamber having at one end a port adapted to co-operate with said ducts and at its other end an aperture opening into the adjacent main chamber.

17. In an apparatus as claimed in claim 8, said radial partitions being hollow, means being provided for by-passing a portion of the pressure-exchange current through said hollow partitions to prevent leakage between the chambers separated by said partitions.

18. In an apparatus as claimed in claim 8, said radial partitions being hollow, means being provided for inducing in said hollow partitions in the region corresponding to compression a pressure slightly above that obtaining in the adjacent chambers, and for inducing in said hollow partitions in the region corresponding to expansion a pressure slightly below that obtaining in the adjacent chambers.

19. In an apparatus according to claim 8, said radial partitions being hollow, distributing ports for said hollow partitions, branches on said ducts, the orifices of said branches being offset relatively to the normal orifices of said ducts, said ports being adapted to co-operate with the orifices of said branches.

20. In an apparatus according to claim 8, means for compensating the variation in volume undergone by the gas flowing through said heat exchanger.

21. In an apparatus according to claim 8, additional chambers of variable volume associated with the first-mentioned chambers, said variable-volume chambers being so connected with said first mentioned chambers as to direct thereinto a compensating current in a direction parallel to the pressure-exchange current.

22. In an apparatus according to claim 8, an eccentric rotor mounted within said ring of chambers, and radial blades slidably mounted in said rotor and forming therewith a compressor, the variable-volume chambers comprised between said blades communicating through suitable openings with the chambers of said ring of chambers.

23. In an apparatus according to claim 8, a shaft eccentric to said ring of chambers, a rotor mounted on said shaft inside said ring of chambers and forming therewith a plurality of variable-volume chambers, said variable-volume chambers communicating with the chambers of said ring of chambers, an internally toothed ring rigidly connected with said ring of chambers, a pinion rigidly connected with said eccentric shaft and meshing with said internally toothed ring.

24. In an apparatus according to claim 8, a rotor eccentrically mounted inside said ring of chambers and forming therewith a plurality of variable-volume chambers, said variable-volume chambers communicating with the chambers of said ring of chambers, and means comprising a worm wheel and worm for varying the angular position of said rotor with respect to the axis of said ring of chambers.

25. In an apparatus according to claim 8, said radial partitions being hollow, a rotor eccentrically mounted inside said ring of chambers and forming therewith a plurality of variable-volume chambers, said variable-volume chambers being connected with the chambers of said ring of chambers and with the interior of said hollow partitions.

26. In a process of performing conversions of thermal and mechanical energy, in which a gas is successively subjected to a compression stage, a heat-exchange stage under constant pressure, and an expansion stage, the steps of circulating the gas in the expansion stage and the gas in the compression stage at a certain speed and in a certain direction, directly transmitting pressure from the gas in the expansion stage to the gas in the compression stage, thus creating a pressure-exchange current, maintaining and guiding said current to cause it to form a gaseous partition between the gas in said compression stage and the gas in said expansion stage.

27. In an apparatus for performing conversions of thermal and mechanical energy, the combination of a stationary part and a movable part, one of said parts comprising a plurality of chambers, the other of said parts comprising a distributor, said distributor comprising a casing communicating with said chambers, inlet and outlet passages for said chambers, and means for periodically establishing communication between said chambers, a heat exchanger connected to said inlet and outlet passages, and means for setting up and maintaining a current of gas within said chambers.

28. In an apparatus for performing conversion of thermal and mechanical energy, the combination of a stationary part and a movable part, a heat exchanger, one of said parts comprising a ring of chambers and radial partitions between said chambers, the other of said parts comprising a casing surrounding said chambers, inlet and outlet passages adapted periodically to connect said chambers with said heat exchanger, and ducts adapted to connect chambers of a region beyond said passages with chambers of a region in front of said passages, and means for setting up and maintaining a current of gas within said chambers and through said ducts.

29. In an apparatus according to claim 8, an eccentric rotor mounted within said ring of chambers, and radial blades slidably mounted in said rotor and forming therewith a compressor, the variable volume chambers comprised between said blades communicating through suitable openings with the chambers of said ring of chambers, and means for varying the angular position of said rotor with respect to said ring of chambers.

30. In an apparatus according to claim 8, an eccentric rotor mounted within said ring of chambers, and radial blades slidably mounted in said rotor and forming therewith a compressor, the variable volume chambers comprised between said blades communicating through suitable openings with the chambers of said ring of chambers, and means for rotating said rotor in the same direction as and at a slightly higher speed than said ring of chambers.

31. In a process of performing conversion of thermal and mechanical energy, in which a gas is successively subjected to a compression stage, a heat exchange stage under constant pressure, and an expansion stage, the step of circulating the gas in the expansion stage and the gas in the compression stage at a certain speed and in a certain direction, directly transmitting pressure from the gas in the expansion stage to the gas in the compression stage, thus creating a pressure exchange current, excluding said pressure exchange current from the heat exchange while maintaining and guiding said current to cause it to form a gaseous partition between the gas in said compression stage and the gas in said expansion stage.

32. In a process of performing conversion of thermal and mechanical energy, in which a gas is successively subjected to a compression stage, a heat exchange stage under constant pressure, and an expansion stage, the step of circulating the gas in the expansion stage and the gas in the compression stage at a certain speed and in a certain direction in an apparatus separate from that in which the gas is subjected to the heat exchange stage, directly transmitting pressure from the gas in the expansion stage to the gas in the compression stage, thus creating a pressure exchange current maintaining and guiding said current so that it circulates with the gas in the compression stage and the gas in the expansion stage in the first mentioned apparatus to cause it to form a gaseous partition between the gas in said compression stage and the gas in said expansion stage but which is not allowed to circulate through the heat exchange apparatus.

ALBERT FRANÇOIS LEBRE.